United States Patent
Kamavaram et al.

(10) Patent No.: US 10,934,476 B1
(45) Date of Patent: Mar. 2, 2021

(54) METHODS FOR CONVERTING SOLID WASTE AND LOW-VALUE LOCAL MATERIALS INTO USEFUL ENGINEERED PRODUCTS SUCH AS PROPPANT

(71) Applicant: Oceanit Laboratories, Inc., Honolulu, HI (US)

(72) Inventors: Venkat Kamavaram, Honolulu, HI (US); Raphael Rodriguez, Honolulu, HI (US); Ganesh Kumar Arumugam, Honolulu, HI (US); Glen Nakafuji, Honolulu, HI (US); Vinod Veedu, Pearland, TX (US)

( * ) Notice: Subject to any disclaimer, the term of this patent is extended or adjusted under 35 U.S.C. 154(b) by 111 days.

(21) Appl. No.: 15/892,375

(22) Filed: Feb. 8, 2018

Related U.S. Application Data

(60) Provisional application No. 62/456,647, filed on Feb. 8, 2017.

(51) Int. Cl.
*C09K 8/80* (2006.01)
*B09B 3/00* (2006.01)

(52) U.S. Cl.
CPC ............ *C09K 8/805* (2013.01); *B09B 3/0033* (2013.01); *B09B 3/0041* (2013.01)

(58) Field of Classification Search
None
See application file for complete search history.

(56) References Cited

U.S. PATENT DOCUMENTS

2016/0137904 A1* 5/2016 Drake .................... C09K 8/536
507/219
2018/0371309 A1* 12/2018 Chan ....................... C09K 8/62

* cited by examiner

*Primary Examiner* — John J Figueroa
(74) *Attorney, Agent, or Firm* — Fresh IP PLC; Clifford D. Hyra; Aubrey Chen

(57) ABSTRACT

A waste material improvement and reuse method involves identifying an available material having a crush resistance that does not meet a requirement for use as proppant, but which can be improved to meet the requirement, and modifying a surface of the available material to improve the crush resistance to meet the requirement by applying a binding agent and/or an encapsulating agent to the available material, forming clumps of particles of the available material and increasing crush resistance.

32 Claims, 2 Drawing Sheets

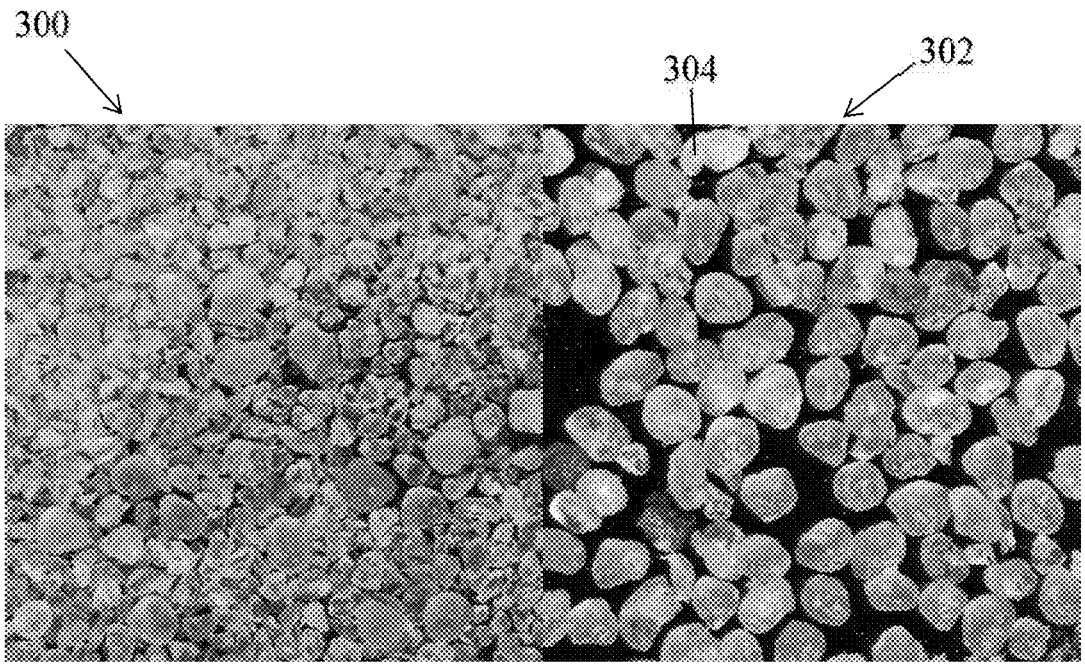
FIG. 3A       FIG. 3B
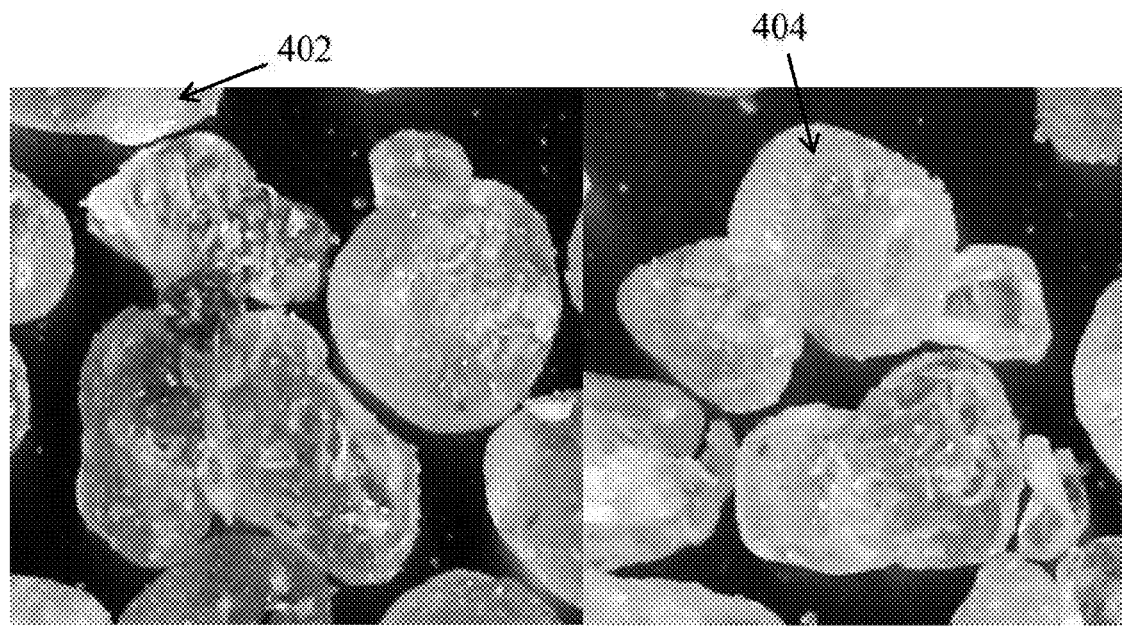
FIG. 4A       FIG. 4B

METHODS FOR CONVERTING SOLID WASTE AND LOW-VALUE LOCAL MATERIALS INTO USEFUL ENGINEERED PRODUCTS SUCH AS PROPPANT

This application claims the benefit of U.S. Provisional Patent Application Ser. No. 62/456,647, filed Feb. 8, 2017, and is related to U.S. Nonprovisional patent application Ser. No. 15/181,350, filed Jun. 13, 2016, and Ser. No. 13/951,065, filed Jul. 25, 2013, each of which is hereby incorporated by reference herein in its entirety.

FIELD OF THE INVENTION

This application relates to the fields of recycling non-hazardous solid waste, material science, proppant, abrasive media, and filtration media.

BACKGROUND

Since the industrial revolution, industrial and mining operations have been accompanied by a problem: industrial waste which may be toxic, ignitable, corrosive or reactive. If improperly managed, this waste can pose dangerous health and environmental consequences. The Resource Conservation and Recovery Act (RCRA) of 1976 establishes the framework for a national system of solid waste control.

Non-hazardous solid waste includes chemically inert and insoluble substances (materials such as rock, brick, glass, dirt and some rubbers and plastics), samples without detectable levels of PCBs or hydrocarbons, and waste which poses no threat to human health and/or the environment. Recycling of such waste can generate value for industry and preserve the environment. Recycling can prevent the wastage of potentially useful materials and reduce the consumption of fresh raw materials, thereby reducing energy usage, air pollution (from incineration), and water pollution (from landfilling).

Mineral waste from mining operations, solid waste from construction and demolition (C&D), and drill cuttings from hydraulic fracturing operations usually consist of valuable natural resources. The waste is usually buried in man-made or natural excavations, such as pits or landfills.

Recycling of waste produced from construction and demolition, hydraulic fracturing and mining operations currently exists, however these operations are not economically viable. Recycling of the waste requires several processing steps which are cost prohibitive and generate additional waste.

Proppant is a costly input to fracking operations. Abrasive media and filtration media are also valuable industrial inputs.

Needs exist for improved systems and methods for recycling non-hazardous solid waste and utilizing low-value available materials to create high-value final products.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A novel approach for recycling solid waste generated from construction and demolition, hydraulic fracturing and mining operations produces a useful engineered product. The process involves modification of a specific property of the waste source materials such that the engineered product has improved properties suitable for a proposed application. As an example, a surface chemistry and mechanical property modification is applied to solid waste such as rocks, wood, minerals and rubber to develop an application that includes: filtration media, fracturing sand and abrasive media.

A new method involves identifying an available material having one or more mechanical properties that do not meet a requirement for use in a given application, but which can be improved to meet the requirement, and modifying a surface of the available material to improve the one or more mechanical properties to meet the requirement by applying a binding agent and/or an encapsulating agent to the available material, forming clumps of particles of the available material with improvements in the one or more mechanical properties over the untreated available material.

Applying the encapsulating agent in some embodiments may include mixing the encapsulating agent with a curing agent.

The one or more mechanical properties may in some embodiments include hardness, compression strength and/or fracture toughness.

In some embodiments, the one or more mechanical properties comprises crush resistance and the given application comprises hydraulic fracturing proppant. In some embodiments, the given application comprises abrasive blasting.

The available material in some embodiments may be nonhazardous solid waste, and the method may also involve grinding the available material into particles in a size range of 50-1000 μm prior to surface modification.

The method may also involve filtering out particle clumps having a smallest dimension greater than 840 microns after the surface modification.

In some embodiments, the available material may include particles and modifying the surface of the available material comprises may involve applying the binding agent to the articles by mixing and/or spraying. Applying the binding agent may involve partially covering particles without completely covering them, forming clumps of particles in which the binding agent forms the core.

In some embodiments, the available material may include particles and modifying the surface of the available material may involve applying the encapsulating agent to the particles by mixing and/or spraying, encapsulating the particles in solid content of the encapsulating agent and forming an agglomerate. The method may also include shrinking the encapsulating agent so that the agglomerate comprises close-packed particles. The encapsulating agent may be stronger than the particles of the available material. The encapsulating agent may be applied as a thick fluid to obtain larger clumps of particles or as a mist to obtain smaller clumps of particles. Applying the encapsulating agent may involve fully encapsulating the particles in the encapsulating agent, forming clumps of particles in which the particles form the core.

The available material may include in some embodiments rock, minerals, brick, glass, dirt, wood, rubber and/or plastic.

The binding agent may in some embodiments be liquid or solid phase and polymer or inorganic. Liquid phase binding agents may include a water-soluble polymer, such as polyvinyl alcohol, hydroxyethyl cellulose, polyacrylamide, Polyvinylpyrrolidone and Polyethylene glycol, an adhesive polymer such as acrylic, vinyl acrylic, styrene acrylic, vinyl acetate and vinyl acetate ethylene, or a polymer resin such as epoxy, polyurethane, and poly vinyl acetate. Solid phase binding agents may include an inorganic mixture, such as NaOH—NaI, tin-silver, alumino-silicates, or sodium silicates.

The encapsulating agent in some embodiments may be a polymer resin, such as epoxy, polyurethane, poly vinyl acetate, silicone, polyester, phenol formaldehyde or vinyl ester.

In some embodiments, the method also includes applying a secondary binder that covers the clumps of particles and further aids in uniform load distribution and determines final size of the clumps of particles.

The method in some embodiments may also include identifying a need for larger clumps of particles and lowering curing temperature to achieve them, or identifying a need for smaller clumps of particles and raising curing temperature to achieve them.

In some embodiments, the available material is brown sand, the application is hydraulic fracturing proppant, and the one or more mechanical properties comprises crush resistance. Applying the encapsulating agent involves applying a coating of vinyl ester, epoxy, polyurethane or phenolic resin encapsulating agent mixed with curing agent in a reactor with continuous mixing and curing for eight hours at room temperature, forming clumps of agglomerated brown sand particles with a crush strength approximately double the untreated brown sand. The untreated brown sand may have a crush resistance of approximately 5,000 psi and the final clumps of agglomerated brown sand particles may have a crush resistance of approximately 10,000 psi. The curing agent may be an amine, such as an aliphatic amine, aromatic amine, modified amine, polyol or polyisocyanate. The brown sand may be 20/60 mesh and the method may also include filtering out the clumps of agglomerated brown sand particles having a smallest dimension >840 microns and then applying the clumps of agglomerated sand particles as a proppant in hydraulic fracturing.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

FIGS. 3A-B illustrate uncoated brown sand (3A) and coated brown sand (3B), according to an embodiment of the present invention.

FIGS. 4A-B illustrate an engineered proppant produced using the approach shown in FIG. 2, according to an embodiment of the present invention.

DETAILED DESCRIPTION

Figure 1:
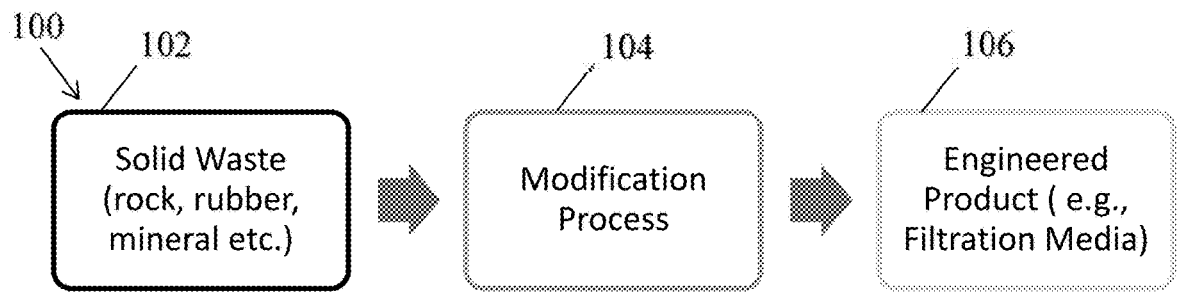
FIG. 1 is a process flow chart for modifying solid waste into useful products, according to an embodiment of the present invention.

This disclosure details methods for converting solid waste and low-cost local materials into useful engineered products.

This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Often, producing a valuable product from waste or other low-value locally available materials requires a key property of the waste that can be utilized for a specific application. Non-hazardous solid waste that contains rock, brick, glass, dirt, rubbers and plastics can be utilized for various applications, depending on the physical and chemical nature of the solid waste (rocks, glass, rubber etc.). For example, applications include but are not limited to chemical filtration media, soils and sediments, metal and mineral extraction, abrasives, fracturing sand and waste water treatment. These applications and many other potential applications can utilize the solid waste materials when the recycled materials meets certain requirements such as physical, chemical, mechanical properties and economics.

Due to high demand for industrial products, high production rates and cost reduction strategies are mandatory. Alternative materials for reducing cost and reducing the logistics burden on storage and transportation are currently explored by several industries. Cheaper, low performing and locally available materials are targeted to meet the needs. One of the sources for cheaper materials is industrial solid waste, however such sourcing involves several steps of sorting, grading, cleaning and qualifying. These steps add to the cost of the materials, however, the extremely low cost of solid waste and the environmental benefits of recycling waste are often far more economical than utilizing pristine raw materials. In addition, industrial waste such as from mining, metal processing, rubber manufacturing, glass manufacturing, construction and demolition, and hydraulic fracturing is much more facile to recycle due to composition and source of waste generation.

An innovative approach converts industrial solid waste into useful low-cost engineered material for several applications, with a focus on performance improvement and cost reduction. The approach involves improving a targeted property of the recycled product (or engineered material) through physical, chemical and/or mechanical processes. For example, for some applications low-strength waste material needs improvement in mechanical properties such as hardness, compression strength and fracture toughness. The improvement may be achieved by several methods that include but are not limited to: coating with an ultra-strong material, binding materials with a strong binder, and alloying/composite formation with a stronger material.

Solid waste in a size range of 50-1000 μm is usually termed fine particles. These fine particles may be produced by grinding larger-sized solid materials. Targeted properties may include but are not limited to mechanical (strength, wear/erosion resistance, and fracture toughness), chemical (oxidation/reduction resistance, corrosion, catalytic, photo/light/thermal reaction) and physical (density, crystallinity, flow characteristics, optical, magnetic, and shape etc.). With these targeted properties, the recycled engineered materials find numerous applications.

The applicant's prior U.S. Nonprovisional utility patent application Ser. No. 15/181,350 demonstrated producing a valuable product, filtration media for separating aqueous and organic mixtures (oil & water), starting with low-value silica media. This involves modifying the surface of silica media from hydrophilic to hydrophobic via chemical group attachment on silica particles. The above surface chemical modification of silica media and subsequent filtration efficiency of modified silica particles is a function of particle size, crystalline structure, quality and morphology. This demonstrates that solid waste can be converted to a useful engineered product, filtration media, using a facile chemical modification process. The surface and chemical modification process is described in detail in that application and U.S. Ser. No. 13/951,065 and can be generalized to be applicable to different solid waste components such as wood, rubber, metal and minerals. This involves modifying the surface through a chemical etching and/or cleaning step followed by chemical functionalization of the surface through a coating process. The functionalized surface can further be coated with polymer or nanocomposite coating and the functional groups on the surface can be crosslinked to the coating. FIG. 1 is a process flow chart 100 illustrating at a high level a process of modifying solid waste into useful products, according to an embodiment of the present invention. Solid waste is selected 102 and modified 104 to improve a desired characteristic to an acceptable level for a desired application, resulting in a useful engineered product 106.

Figure 2:
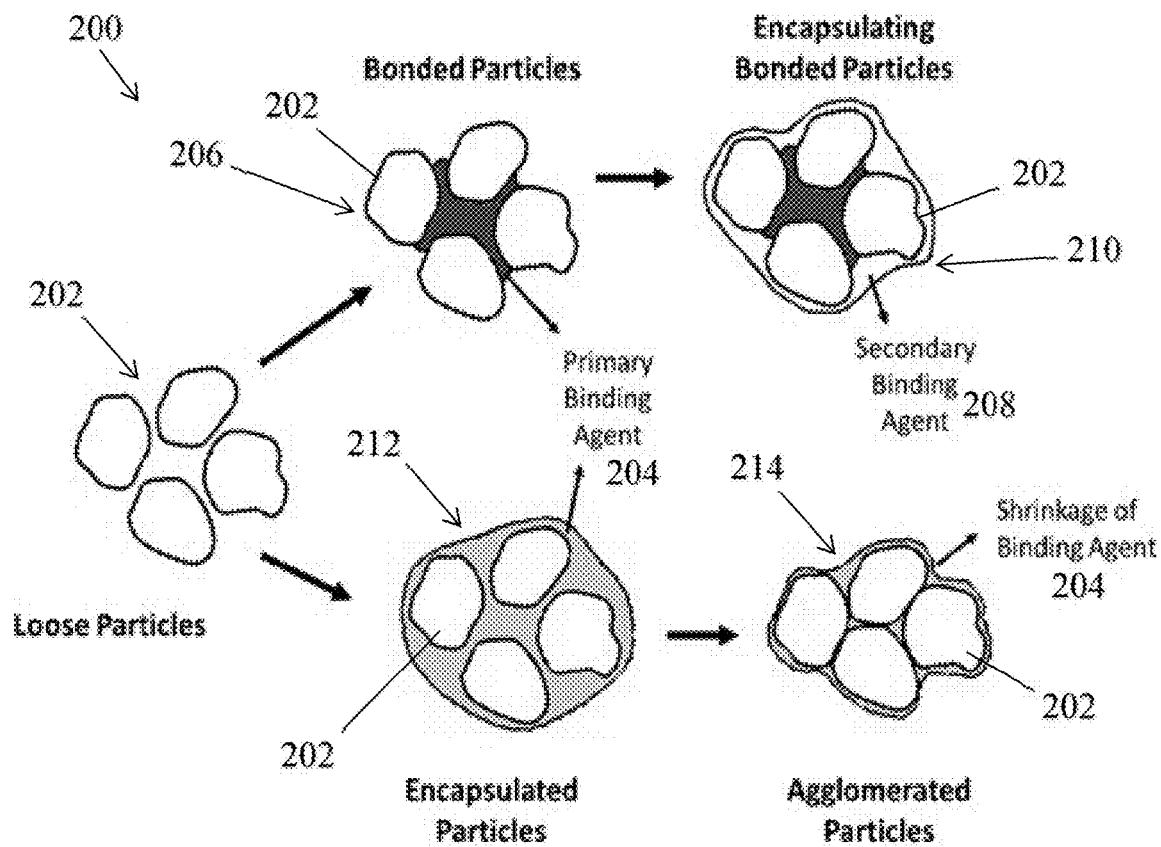
FIG. 2 illustrates the modification of particles to form engineered materials with increased mechanical properties, according to an embodiment of the present invention.

As mentioned above, engineered product can be used as abrasive media for sand blasting and cleaning, and as fracturing sand, where the key properties required are mechanical strength and wear resistance. Solid waste that may be used includes rock, wood, minerals, and rubber, which provide useful dense and chemically sustainable material. Particles in the size range of 50-1000 μm are not useful in their natural form due to lower mechanical properties, hence there is a need for further size sorting and process treatment (chemical and mechanical) to meet the requirements. A novel process improves the mechanical properties of these solid waste material to produce engineered materials/products. The waste source materials can include but are not limited to rock, rubber, wood, mineral and plastic. Such a treatment process 200 for producing engineered materials is illustrated in FIG. 2.

The process shows that the improvement in mechanical property can be achieved through two routes. First, binding the particles 202 using a binding agent 204 enables binding of particles into aggregated particles 206 with improved strength due to enhanced load distribution within the engineered material. The binding may be carried out by blending the particles and the binding agent together in a low-shear mixer (e.g. tumble mixer, ribbon mixer, conical screw mixer, paddle mixer etc.) until the blend appears well-mixed. Low-shear mixing ensures that the particles are fully coated. The binding agent 204 may be liquid or solid phase and polymer or inorganic. A liquid phase binder may be for example a water-soluble polymer (e.g., polyvinyl alcohols, hydroxyethyl celluloses, polyacrylamide, Polyvinylpyrrolidone and Polyethylene glycol), adhesive polymer (acrylic, vinyl acrylic, styrene acrylic, vinyl acetate and vinyl acetate ethylene), or polymer resin (epoxy, polyurethane, poly vinyl acetate). Solid phase binders include inorganic mixtures such as NaOH—NaI, tin-silver, alumino-silicates, and sodium silicates. To further improve the strength of aggregated particle 206, a secondary binder 208 may be applied which covers the aggregated particle 210 and further aids in uniform load distribution. The secondary binder 208 determines the final particle size of the engineered product. The secondary binder may be selected from any of the above-mentioned binding agents, based on application and desired strength. The secondary binder may, for example, be a thermoset polymer resin (e.g. epoxy, polyurethane, poly vinyl acetate) and provides the final strength to the aggregated particles.

Second, applying an encapsulating agent to pack the particles 202 in a medium such as polymer or inorganic compound can achieve the same purpose. The encapsulating agent may be a polymer resin such as epoxy, polyurethane, poly vinyl acetate, silicone, polyester, phenol formaldehyde and vinyl ester. The encapsulating agent may be applied to particle agglomerates through a mixing or spraying process whereby the liquid wets the particles and, upon liquid evaporation, encapsulates the particles in the solid content of the encapsulating agent to form encapsulated particles 212. The encapsulating agent 204 shown in FIG. 2 is the same as primary binding agent 204, and can further shrink and form a strong agglomerate 214 with close-packed particles as shown in FIG. 2. The encapsulating agent, being mechanically stronger than the particles, yield a stronger engineered particle.

The size of the engineered particle can be controlled through the properties of the encapsulating agent, the spraying process and drying process, moreover it also depends on the size range of the starting materials. For example, encapsulating agents (resins) with shorter curing times result in larger particles (clumps), as the mixing process cannot separate the particles enough to break the clumps into smaller particles. In the spraying process, encapsulating agents may be dispensed as a mist or as a thick fluid, which delivers a uniform or non-uniform coating, respectively, and which results in smaller or larger clumps, respectively. In terms of the drying process, high temperature curing results in smaller particles as the resin dries (cures) faster, however low temperature curing results in clumps (larger particles) as the resin cures more slowly.

The encapsulating particles route is different compared to the binding particle approach in that the particles are fully encapsulated in the agent/media, and the particles thereby form the core of the engineered particle, whereas in the particle binding approach the particles are bound together using a binder that partially covers the particles, enough to bind them together but not to cover them completely. Both approaches are focused to provide improved mechanical strength to the engineered material upon modification.

Example

In this example, the application of sand as proppant for fracturing operations was investigated. A coating was applied to low-strength brown sand to improve the strength using an approach described in FIG. 2. FIGS. 3A-B show the brown sand 304 before (3A) 300 and after (3B) 302 coating. The coating consisted of a resin encapsulating agent (Vinyl ester, Epoxy, Polyurethane or Phenolic) mixed with curing agent and cured at room temperature for 8 hrs. The curing agent used may be an amine, such as aliphatic amines, aromatic amines, or modified amines, polyol or polyisocyanate. The coating is applied in a reactor with continuous mixing of the contents to ensure a good coating of sand particles.

The strength of proppant, which is termed as crush resistance, is the resistance to crushing under a specific load and is defined as the maximum load that results in less than 10% fines by weight. Fines are defined as crushed proppant with a size below the lowest size of the starting proppant. The brown sand used in this example is 20/60 mesh size (840-250 microns), so fines produced will be in the size range below 250 microns. Crush strength is measured by placing a fixed amount of sample in a cell and loading the cell to a fixed load, with care taken to ensure the proppant pack is under uniform load. At different loadings, the amount of fines produced is measured by sieving the tested proppant using a lower mesh size (60 mesh in this case).

Coated brown sand showed significant improvement to a crush resistance of 10,000 psi as compared to uncoated brown sand with a crush strength of 5,000 psi. Table 1 compares the size range and crush strength of brown sand before and after the coating process. Clearly, the size range of coated sand is larger than the brown sand, as the smaller particles are bound into larger particles. FIGS. 4A-B show bound particles 402, 404 resulting from the coating process. The oversized proppant (>840 micron) is separated from the product prior to application as a proppant in hydraulic fracturing.

TABLE 1

Property comparison of brown sand and coated brown sand

| Property/Material | Brown Sand | Coated Brown Sand |
|---|---|---|
| Sieve Analysis (mesh size) | 20/60 (250-840 micron) | 20/40 (420-840 micron) |
| Crush Resistance | 5000 psi | 10,000 psi |

Starting with the same brown sand material, but applying a hydrophobic or oleophobic coating instead of a binding agent to give the particles a desired hydrophobic or oleophobic property, allows the material to be used for a different application as filtration media.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method, comprising:
   identifying an available material having one or more mechanical properties that do not meet a requirement for use in a given application, but which can be improved to meet the requirement;
   modifying a surface of the available material to improve the one or more mechanical properties to meet the requirement by applying a binding agent and/or an encapsulating agent to the available material, forming clumps of particles of the available material with improvements in the one or more mechanical properties over the untreated available material; and
   filtering out particle clumps having a smallest dimension greater than 840 microns after the surface modification.

2. The method of claim 1, wherein the one or more mechanical properties comprises crush resistance and the given application comprises hydraulic fracturing proppant.

3. The method of claim 1, wherein the given application comprises abrasive blasting.

4. The method of claim 1, wherein the available material is nonhazardous solid waste, further comprising grinding the available material into particles in a size range of 50-1000 μm prior to surface modification.

5. The method of claim 1, wherein the available material comprises particles and modifying the surface of the available material comprises applying the binding agent to the articles by mixing and/or spraying.

6. The method of claim 5, wherein applying the binding agent comprises partially covering particles without completely covering them, forming clumps of particles in which the binding agent forms the core.

7. The method of claim 1, wherein the available material comprises particles and modifying the surface of the available material comprises applying the encapsulating agent to the particles by mixing and/or spraying, encapsulating the particles in solid content of the encapsulating agent and forming an agglomerate.

8. The method of claim 7, further comprising shrinking the encapsulating agent so that the agglomerate comprises close-packed particles.

9. The method of claim 7, wherein applying the encapsulating agent comprises fully encapsulating the particles in the encapsulating agent, forming clumps of particles in which the particles form the core.

10. The method of claim 1, wherein the available material comprises rock, minerals, brick, glass, dirt, wood, rubber and/or plastic.

11. The method of claim 1, wherein the binding agent is liquid or solid phase and polymer or inorganic.

12. The method of claim 11, wherein the binding agent is liquid phase and comprises a water-soluble polymer, adhesive polymer, or polymer resin.

13. The method of claim 12, wherein the binding agent comprises one or more of polyvinyl alcohol, hydroxyethyl cellulose, polyacrylamide, Polyvinylpyrrolidone and Polyethylene glycol.

14. The method of claim 12, wherein the binding agent comprises one or more of acrylic, vinyl acrylic, styrene acrylic, vinyl acetate and vinyl acetate ethylene.

15. The method of claim 12, wherein the binding agent comprises one or more of epoxy, polyurethane, and poly vinyl acetate.

16. The method of claim 11, wherein the binding agent is solid phase and comprises an inorganic mixture.

17. The method of claim 16, wherein the binding agent comprises one or more of NaOH—NaI, tin-silver, aluminosilicates, and sodium silicates.

18. The method of claim 1, wherein the encapsulating agent is a polymer resin.

19. The method of claim 18, wherein the polymer resin is one or more of epoxy, polyurethane, poly vinyl acetate, silicone, polyester, phenol formaldehyde and vinyl ester.

20. The method of claim 1, further comprising applying a secondary binder that covers the clumps of particles and further aids in uniform load distribution and determines final size of the clumps of particles.

21. The method of claim 1, wherein the encapsulating agent is stronger than the particles of the available material.

22. The method of claim 1, wherein applying the encapsulating agent comprises mixing the encapsulating agent with a curing agent.

23. The method of claim 1, wherein the one or more mechanical properties comprise hardness, compression strength and/or fracture toughness.

24. The method of claim 1, further comprising either applying the encapsulating agent as a thick fluid to obtain larger clumps of particles, or applying the encapsulating agent as a mist to obtain smaller clumps of particles.

25. The method of claim 1, further comprising either identifying a need for larger clumps of particles and lowering curing temperature of the clumps of particles, thereby generating the larger clumps of particles, or identifying a need for smaller clumps of particles and raising curing temperature of the clumps of particles, thereby generating the smaller clumps of particles.

26. A method, comprising:
identifying an available material having one or more mechanical properties that do not meet a requirement for use in a given application, but which can be improved to meet the requirement; and
modifying a surface of the available material to improve the one or more mechanical properties to meet the requirement by applying a binding agent and/or an encapsulating agent to the available material, forming clumps of particles of the available material with improvements in the one or more mechanical properties over the untreated available material,
wherein the available material is brown sand, the application is hydraulic fracturing proppant, and the one or more mechanical properties comprises crush resistance, wherein applying the encapsulating agent comprises applying a coating of vinyl ester, epoxy, polyurethane or phenolic resin encapsulating agent mixed with curing agent in a reactor with continuous mixing and curing for eight hours at room temperature, forming clumps of agglomerated brown sand particles with a crush strength approximately double the untreated brown sand, and
wherein the brown sand is 20/60 mesh and further comprising filtering out the clumps of agglomerated brown sand particles having a smallest dimension >840 microns and then applying the clumps of agglomerated sand particles as a proppant in hydraulic fracturing.

27. The method of claim 26, further comprising either identifying a need for larger clumps of particles and lowering curing temperature of the clumps of particles, thereby generating the larger clumps of particles, or identifying a need for smaller clumps of particles and raising curing temperature of the clumps of particles, thereby generating the smaller clumps of particles.

28. A method, comprising:
identifying an available material having one or more mechanical properties that do not meet a requirement for use in a given application, but which can be improved to meet the requirement;
modifying a surface of the available material to improve the one or more mechanical properties to meet the requirement by applying a binding agent and/or an encapsulating agent to the available material, forming clumps of particles of the available material with improvements in the one or more mechanical properties over the untreated available material; and
either applying the encapsulating agent as a thick fluid to obtain larger clumps of particles, or applying the encapsulating agent as a mist to obtain smaller clumps of particles.

29. A method, comprising:
identifying an available material having one or more mechanical properties that do not meet a requirement for use in a given application, but which can be improved to meet the requirement;
modifying a surface of the available material to improve the one or more mechanical properties to meet the requirement by applying a binding agent and/or an encapsulating agent to the available material, forming clumps of particles of the available material with improvements in the one or more mechanical properties over the untreated available material; and
either identifying a need for larger clumps of particles and lowering curing temperature of the clumps of particles, thereby generating the larger clumps of particles, or identifying a need for smaller clumps of particles and raising curing temperature of the clumps of particles, thereby generating the smaller clumps of particles.

30. The method of claim 26, further comprising either applying the encapsulating agent as a thick fluid to obtain larger clumps of particles, or applying the encapsulating agent as a mist to obtain smaller clumps of particles.

31. The method of claim 26, wherein the curing agent is an amine.

32. The method of claim 31, wherein the curing agent is an aliphatic amine, aromatic amine, modified amine, polyol or polyisocyanate.

* * * * *